United States Patent [19]

Masuko et al.

[11] 4,098,715

[45] Jul. 4, 1978

[54] PROCESS FOR BLENDING LIQUID RUBBER AND CARBON BLACK

[75] Inventors: Tatsuo Masuko; Osami Yanagida; Shunji Yamamoto, all of Yokkaichi, Japan

[73] Assignee: Mitsubishi Chemical Industries Ltd., Tokyo, Japan

[21] Appl. No.: 713,485

[22] Filed: Aug. 11, 1976

Related U.S. Application Data

[63] Continuation of Ser. No. 541,717, Jan. 17, 1975, abandoned.

[30] Foreign Application Priority Data

Jan. 30, 1974 [JP] Japan .................................. 49-11748

[51] Int. Cl.$^2$ ............................................. C09D 3/00
[52] U.S. Cl. ................... 252/182; 260/763; 106/285; 106/307
[58] Field of Search ............. 252/182; 260/763, 42.56; 106/285, 307

[56] References Cited

U.S. PATENT DOCUMENTS 3,909,281   9/1975   Yamawaki .......................... 106/285

FOREIGN PATENT DOCUMENTS 649,800   10/1962   Canada .............................. 260/42.56

OTHER PUBLICATIONS

Daniel, T. J., et al., "Liquid Rubber for Reinforced Rubber Products: A Technical and Economic Assessment", *Journal of the IRI*, vol. 6, Dec. 1972, pp. 253–258.
Blow, C. M., Ed., *Rubber Technology and Manufacture*, Butterworth & Co. (Publishers) Ltd., London, 1971, pp. 269–273.
Berry, J. P. et al., "Liquid Rubbers and the Problems Involved in Their Application," *Polymer*, vol. 15, Aug. 1974, pp. 521–526.
Humpidge, R. T. et al., "Processing and Properties of Liquid Rubbers" *Rubber. Chem. Tech*, vol. 46, 1973, pp. 148–160.
Perry, R. H., *Chemical Engineers' Handbook*, McGraw-Hill Book Co., New York, 1973, pp. 9–17.

*Primary Examiner*—Benjamin R. Padgett
*Assistant Examiner*—Deborah L. Kyle
*Attorney, Agent, or Firm*—Oblon, Fisher, Spivak, McClelland & Maier

[57] ABSTRACT

Carbon black and liquid rubber are blended to form a dispersion by mixing 60 to 150 parts by weight of the carbon black with 100 parts by weight of the liquid rubber to form an initial dispersion of the carbon black in the liquid rubber and diluting the dispersion with additional liquid rubber to prepare a composition having the required carbon black content.

7 Claims, No Drawings

PROCESS FOR BLENDING LIQUID RUBBER AND CARBON BLACK

This is a continuation of application Ser. No. 541,717, filed Jan. 17, 1975 now abandoned.

BACKGROUND OF THE INVENTION

1. Field of the Invention

The present invention relates to a process for blending liquid rubber and carbon black with a high torque mixer, which is a mixer for highly viscous material, without the use of special apparatus such as a roller mill to easily give a composition of carbon black and liquid rubber in which the carbon black is uniformly dispersed.

2. Description of the Prior Art

The reinforcing effect of carbon black on liquid rubber is substantial as well as on conventional synthetic rubbers. Carbon black can be effectively combined with liquid rubber as a reinforcing filler. Further, it is very difficult to uniformly disperse carbon black in liquid rubber with a simple mixer such as a high torque type mixer except by using a special apparatus which involves complicated operations or special operations. The desired reinforcing effect of the filler in the rubber cannot be obtained without a uniform dispersing operation.

The known methods of blending carbon black with a liquid rubber to form a uniform dispersion include the use of a paint roller mill (three roller mill), a mill, and a special continuous mixer (manufactured by RAPRA). However, in order to uniformly blend and disperse the filler and rubber, it is necessary to pass the mixture through the apparatus many times and large size apparatus for practical industrial use have not been commercialized. When carbon black is blended with a viscous liquid such as liquid rubber, it is necessary to crush the carbon black in the blend because carbon black is usually obtained as beads so that grinding type apparatus have been required.

It has been reported that the dispersibility of carbon black in liquid rubber is poor even when the components are blended for a long time in a conventional mixer for viscous liquids such as high speed mixers for bread powder, mixers having Z-type blades, transfer mixers, corn mixers and the like. [Journal of Nippon Rubber Associate, Vol. 45 No. 3 (1972) Pages 54–62 and Rubber Digest, Vol. 25 No. 10 (1973) Pages 19–24].

A method of blending has also been proposed in which carbon black is blended with the liquid rubber in a wet master batch system wherein the liquid rubber is contacted and mixed with a dispersion of carbon black in water under suitable conditions to give a granular dispersion and then the granules are dried and diluted with the liquid rubber. The method is excellent for mass production, but is not suitable for small scale production in long production lines. A need therefore continues to exist for a method of simply and uniformly blending carbon black in liquid rubber.

SUMMARY OF THE INVENTION

Accordingly, one object of the present invention is to provide a process for blending liquid rubber and carbon black to prepare a composition in which the carbon black is uniformly dispersed in the liquid rubber by using a simple, high torque mixer.

Another object of the present invention is to overcome the disadvantages of the conventional methods by using special mixers in which the composition to be blended is passed through the apparatus many times.

Briefly, these objects and other objects of the present invention as hereinafter will become more readily apparent, can be attained by providing a multi-step blending method wherein the liquid rubber is mixed with a relatively large amount of carbon black to prepare a preliminary dispersion having a relatively high uniformity which is then diluted with the liquid rubber to give a composition having a desired carbon black content, by using a mixer normally used for viscous liquids such as a Bumbury's mixer, a multi-purpose mixer which has a stirrer rotating on its axis about the center or a kneader without using special apparatus.

DETAILED DESCRIPTION OF THE PREFERRED EMBODIMENTS

It is known that the dispersing rate of carbon black in compositions and the mechanical properties of cured products prepared from the compositions are as excellent as the properties of the compositions prepared by complicated operations using a paint roller mill or by the wet master batch system.

In the present process, 60–150 parts by weight of carbon black are mixed with 100 parts by weight of the liquid rubber, and the mixture is stirred to prepare an initial dispersion of carbon black in the liquid rubber. Thereafter, the liquid rubber is added to the dispersion which dilutes the composition to a predetermined concentration of carbon black, whereby the final composition of carbon black and liquid rubber is prepared.

The liquid rubber used in the process of the present invention is a polymer with a low molecular weight such as 500–30,000, preferably 1,000–20,000. Conjugated diene polymers are especially suitable as the low molecular weight polymers and are prepared by polymerizing or copolymerizing suitable monomers. Suitable conjugated diene monomers include butadiene, isoprene, chloroprene, pentadiene, and the like. Suitable comonomers include vinyl monomers such as styrene, isobutylene, acrylonitrile, acrylic ester, methacrylic ester, vinyl ether and the like. Suitable polymerization methods for the liquid rubber include radical polymerization, anion polymerization. emulsion polymerization, solution polymerization and the like.

The low molecular weight polymers can have a terminal functional group as a result of the polymerization reactions and they can be effectively used in the process of the invention. Suitable functional groups include hydroxyl, carboxyl, sulfonic acid, epoxy, amino, thiol and the like. The methods of preparation of the polymers having the functional groups include radical polymerization of the diene and/or vinyl monomer using an azobis catalyst having a suitable functional group or hydrogen peroxide. Another method of preparing the functinal group containing polymer is the living polymerization of the monomer in the presence of an alkali metal catalyst and then reacting an epoxy compound such as ethyleneoxide, epichlorohydrin, or the like; carbon dioxide or an aldehyde with the polymer. The low molecular weight polymers can be hydrogenated, if necessary and then used in the process of the invention.

The reinforcing carbon black fillers used in the present process include those such as:

SAF — (Super abrasion furnace black);

ISAF — (Intermediate super abrasion furnace black);
HAF — (High abrasion furnace black);
FEF — (Fast extrusion furnace black);
GPF — (General purpose furnace black), and
FT — (Fine thermal black).

The forms of the carbon black used may vary and include powders, pellets, and soft and hard beads. The process of the present invention is especially effective when soft and hard beads are used. The commercial carbon blacks usually contain 0.5 - 2 wt.% water. However, the water can be substantially removed by the heat generated during the mixing operation with the liquid rubber. However, if complete removal of the water is desired, the carbon black can be preheated or can be mixed while heated or mixed under reduced pressure. In the stirring and dispersing of the mixture of carbon black and the liquid rubber in the first stirring operation, 60 - 150 parts by weight, preferably 80 - 120 parts by weight of the carbon black is mixed with 100 parts by weight of the liquid rubber, and the mixture is well stirred to uniformly disperse the carbon black in the liquid rubber. When less than 60 parts by weight, for example, about 50 parts by weight, of carbon black are used per 100 parts by weight of the liquid rubber, the dispersion of the carbon black in the liquid rubber is very soft. If the granular carbon black has a diameter of 1 - 3 mm, the dispersion is especially soft. Accordingly, it is difficult to impart high shearing forces to the carbon black particles by stirring them with a mixer for highly viscous material. Therefore, the dispersion of carbon black in the liquid rubber is very poor even though the mixture is stirred for a long period. Accordingly, in the process of the present invention, the ratio of carbon black to 100 parts by weight of the liquid rubber should be greater than 60 parts by weight in the first mixing operation. If the amount of carbon black in the first stirring operation is greater than 150 parts by weight, the resulting preliminary dispersion is dusty and accordingly, the carbon black dispersing rate is not satisfactory. Therefore, the amount of carbon black in the first stirring operation should be less than 150 parts by weight.

As stated above, heretofore it has been believed that a suitable dispersion could not be obtained when carbon black is mixed in liquid rubber by a high speed mixer which is normally used for bread powder for instance, because the mixture of the liquid rubber with a small amount of carbon black, especially granular carbon black, is too soft to obtain a sufficient shearing force on the carbon black particles so that the carbon black particles are not crushed to form a uniform dispersion. In accordance with the present process, 60 - 150 parts by weight of carbon black are mixed with 100 parts by weight of the liquid rubber, and the mixture is stirred in the first stirring operation. A high shearing force is generated and can be effectively imparted to the carbon black even with a mixer which is used for highly viscous materials to give an excellent dispersion.

The process for blending liquid rubber and carbon black is further illustrated. The amount of carbon black affects the viscosity of the dispersion in the liquid rubber. When carbon black is admixed with the liquid rubber (100 parts by weight), the viscosity of the dispersion increases depending upon the increased amount of carbon black to reach a maximum viscosity at certain amounts of carbon black. When the amount of carbon black increases beyond the limit, the viscosity of the dispersion decreases and the dispersion becomes dusty. The amount of carbon black which imparts the maximum viscosity to the dispersion is dependent upon the surface condition of the carbon black, the particle diameter and kind of carbon black. The amount of carbon black relative to liquid rubber which imparts the maximum viscosity to the dispersion can be estimated by calculation from the absorbed volume of dibutylphthalate in each carbon black. (The absorbed volume of dibutylphthalate can be given by the amount of dibutylphthalate (cc) which imparts the maximum torque upon stirring the mixture when dibutylphthalate is added dropwise to 100 g of carbon black while stirring. Hereinafter the absorbed volume is referred to as the DBP absorbed volume). For example, when an HAF carbon black having a DBP absorbed volume of 110 is mixed with the liquid rubber having a specific gravity of 0.89 (R-45 HT), it is estimated from a calculation, that the maximum viscosity is imparted at a ratio of carbon black of $100/(100\times0.89)\times100=102$ (parts by weight). In a practical test, the maximum viscosity is given at the ratio of carbon black of about 100 parts by weight per 100 parts by weight of the liquid rubber. It is clear from this fact, that in the first stirring operation of a mixture of carbon black and liquid rubber, the viscosity of the dispersion and the power and time which are required for stirring in order to obtain a suitable dispersion can be controlled by selecting the amount of carbon black depending upon the kind of carbon black relative to the liquid rubber. For example, when the HAF carbon black is used, the maximum shearing force can be imparted by mixing an equal weight of the HAF carbon black with the liquid rubber which results in uniform dispersion of the carbon black in a short time. On the other hand, the load on the mixer is greatest. However, if there is sufficient power for stirring, no trouble will be encountered. However, in order to uniformly disperse the carbon black in high efficiency at lesser stirring powers, the following method can be employed. First, carbon black is mixed with the liquid rubber in a ratio such that the maximum viscosity is imparted and the stirring operation is started. In the first stage, the viscosity of the dispersion is low because the carbon black is in granular form. The viscosity of the mixture increases depending upon the extent of crushing of the granular carbon black which imparts a high load to the system. Accordingly, the liquid rubber is gradually added to decrease the viscosity as desired to continue the stirring operation under the desired load. In order to employ the method in an industrial operation, for example, the liquid rubber and carbon black are charged in quantities such that the amount of carbon black present is that which is necessary for the maximum viscosity, in a batch type mixer for highly viscous material, and the mixture is stirred and the liquid rubber is added to the mixture depending upon the pulverizing carbon black in a batch operation. When a continuous kneader is used, it is possible to add the liquid rubber from suitable inlets disposed at suitable distances at suitable feeding velocities. The stirring and dispersing operation in the process of the invention can be easily attained by using a conventional blender such as a kneader and mixer for highly viscous materials and a Bumbury's mixer which is used for blending solid rubber and carbon black. Of course, the use of special blenders is not excluded in the process of the invention.

In accordance with the stirring and dispersing operation, a mixture of a relatively large amount of carbon black uniformly dispersed in the liquid rubber can be easily obtained (preliminary dispersed composition). According to the process of the invention, suitable amounts of the liquid rubber are added to the resulting mixture which has a high carbon black content to dilute the mixtue so as to give a composition having a carbon black content suitable for the purpose of application.

The diluting ratio can be selected depending upon the purpose of the application of the composition. Usually, the ratio of carbon black of less than 40 parts by weight, preferably less than 20 parts by weight per 100 parts of the liquid rubber is used. In the diluting operation, if the diluting ratio is too high, the difference in viscosity of the dilution is too high so a long time is required to achieve a uniform dilution or to obtain a nonuniform dilution. In such cases a composition having the desired carbon black content can be obtained in a short time by employing a multi-stage diluting method such as a two or more stage dilution.

The diluting operation can be attained by adding a suitable amount of the liquid rubber to the resulting dispersion having a high carbon black content and stirring the mixture in a simple manner.

The resulting composition is one of highly dispersed carbon black and is the same as those compositions prepared from a paint roller mill or a wet master batch method, which are complicated operations.

The composition of carbon black and liquid rubber prepared by the process of the invention can be used for various applications. For example, cured products having various properties can be prepared by cross-linking a mixture of the composition and a curing agent, a catalyst and other additives. The curing agents used have a close relationship to the functional group within the liquid rubber. For example, polyisocyanates, polyfunctional acid anhydrides, epoxy compounds, polyols, polyamines, and the like can be effectively used. Carbon black is uniformly dispersed in the compositions and accordingly, the properties of the cured product prepared from these compositions are excellent especially with respect to mechanical strength.

Having generally described this invention, a further understanding can be obtained by reference to certain specific examples which are provided herein for purposes of illustration only and are not intended to be limiting unless otherwise specified.

In the Examples, the term "parts" means "parts by weight". The terms of TES, EL and HD represent tensile strength, elongation and hardness of the crude product. The dispersing rate of carbon black was measured by the microscopic method stated in the Journal of Nippon Rubber Association, Vol. 41, No. 4 Pages 338–345 (1968) under the following equation:

$$\text{dispersing rate} = \left(1 - \frac{\text{lattice number of carbon black}}{\text{total lattice number}}\right) \times 100\ (\%)$$

The liquid rubber used in the Examples and Reference Examples have the composition and properties stated in the following Table.

| Liquid rubber | Monomer components and ratio thereof | Functional Group | Average molecular weight | Viscosity (30° C) |
|---|---|---|---|---|
| R-45 HT | butadiene (100%) | -OH | 2750 | 50 |
| CN-15 | butadiene:acrylo-nitrile 85 : 15 | -OH | 4500 | 460 |

EXAMPLE 1

A modified multipurpose mixer (manufactured by Sanei Seisaku-Sho 5 DMV-r) which has a stirrer rotating on its axis at 283 rpm and around its center at 134 rpm to trace a hypocycloid curve and which has a 3 liter vessel, is a hook, vacuum heat type and has a stirring power of 200W, was employed to blend carbon black and liquid rubber. Into the mixer were charged 330 g of the liquid rubber R-45 HT and 233 g of HAF hard carbon black beads having a water content of 1.0 wt. % (231 g of the carbon black component). 70 Parts by weight of carbon black were mixed with 100 parts of liquid rubber in the mixer. The mixture was stirred for about 4 hours and a uniform dispersion of carbon black in liquid rubber was obtained. Then, 439 g of the liquid rubber R-45 HT. 7.7 g of antioxidant (Antage BHT manufactured by Kawaguchi Chemical Co., Ltd.) and 0.77 g of dibutyl-tin-dilaurate (DBTL) were mixed into the dispersion. (The carbon black content was decreased from 70 parts to 30 parts per 100 parts of liquid rubber). The mixture was heated to 70° C and was mixed under a reduced pressure of 5 mmHg for 1 hour. The mixture was deairated to give a composition of carbon black in liquid rubber wherein a 100% dispersing rate of carbon black was obtained.

EXAMPLE 2

Into the mixer of Example 1, 230.8 g of the liquid rubber R-45 HT and 233 g of hard HAF beads (water content of 1.0 wt. %) were charged. The amount of carbon black to liquid rubber was 100 parts to 100 parts. When the mixing operation was started at room temperature, the load was increased to 5.5 Amp (rated value of 4.7 Amp.) with an overload after 2 minutes, and accordingly the stirring operation was stopped. Thereafter, 57.7 g of the liquid rubber R-45 HT was added whereby the carbon black content was decreased from 100 parts to 80 parts per 100 parts of liquid rubber. The mixture was further mixed for 1 hour (at 4.0 Amp. which is less than the rated value) to give a uniform dispersion of carbon black in liquid rubber. Then, 96.2 g of the liquid rubber R-45 HT was mixed with the dispersion for 30 minutes (the carbon black content was decreased from 80 parts to 60 parts per 100 parts of liquid rubber). Then, 384.6 g of the liquid rubber R-45 HT, 7.7 g of antioxidant (Antage BHT) and 0.77 g of dibutyl-tin-dilaurate were mixed with the dispersion (the carbon black content was decreased from 60 parts to 30 parts per 100 parts of liquid rubber). The mixture was heated to 70° C under a reduced pressure of 5 mmHg for 30 minutes to give a composition of carbon black and liquid rubber with a carbon black dispersion rate of 100%.

EXAMPLE 3

Into the mixer of Example 1 were charged 256.4 g of the liquid rubber R-45 HT and 233 g of hard HAF carbon black beads (water content of 1.0 wt. %) and the mixture was mixed at room temperature for 30 minutes (the carbon black content was 90 parts per 100 parts of liquid rubber). Then 73.3 g of the liquid rubber was added to the dispersion (the carbon black content was decreased to 70 parts per 100 parts of liquid rubber). The mixture was mixed for 30 minutes and then 131.9 g of the liquid rubber R-45 HT was added to the dispersion (the carbon black content was decreased to 50 parts per 100 parts of liquid rubber). The mixture was mixed for another 30 minutes. Then 307.7 g of the liquid rubber R-45 HT, 7.7 g of antioxidant (Antage BHT) and 0.77 of dibutyl-tin-dilaurate were mixed with the dispersion and the mixture was treated as in Example 2 to give a composition of carbon black and liquid rubber having a carbon black dispersion rate of 100%.

EXAMPLE 4

Into the mixer of Example 1, were charged 384.7 g of the liquid rubber CN-15 and 233 g of hard HAF carbon black beads (water content of 1.0 wt. %) and the mixture was mixed at room temperature for 4 hours (the carbon black content was 60 parts per 100 parts of liquid rubber). Then 384.6 g of the liquid rubber CN-15, 7.7 g of antioxidant (Antage) 2.31 g of dibutyl-tin-dilaurate were mixed into the dispersion (the carbon black content was decreased to 30 parts per 100 parts of liquid rubber). The mixture was treated as in Example 2 to give a composition of carbon black and liquid rubber having a carbon black dispersion rate of 100%.

EXAMPLE 5

Into the mixer of Example 1 were charged 192.3 g of the liquid rubber R-45 HT and 233 g of hard GPF carbon black beads (water content of 1.0 wt. %) and the mixture was mixed at room temperature for 30 minutes (the carbon black content was 120 parts per 100 parts of liquid rubber). Then, 38.5 g of the liquid rubber R-45 HT was added and mixed for 30 minutes (the carbon black content was decreased to 100 parts per 100 parts of liquid rubber). Thereafter, 98.9 g of the liquid rubber R-45 HT were added and mixed for 30 minutes (the carbon black content was decreased to 70 parts per 100 parts of liquid rubber). Further, 439.6 g of liquid rubber R-45 HT, 7.7 g of antioxidant (Antage BHT) and 0.77 g of dibutyl-tin-dilaurate were mixed into the dispersion (the carbon black content was decreased to 30 parts per 100 parts of liquid rubber). The mixture was treated as in Example 2 to give a composition of carbon black and liquid rubber having a carbon black dispersion rate of 100%.

REFERENCE EXAMPLE 1

Into the mixer of Example 1 were charged 461.6 g of the liquid rubber R-45 HT and 233 g of hard HAF carbon black beads and the mixture was mixed at room temperature for 4 hours (the carbon black content was 50 parts per 100 parts of liquid rubber). A 307.7 g amount of the liquid rubber R-45 HT, 7.7 g of antioxidant (Antage BHT) and 0.77 g of dibutyl-tin-dilaurate were mixed into the dispersion (the carbon black content was decreased to 30 parts per 100 parts of liquid rubber) and the mixture was treated as in Example 2 to give a composition of carbon black and liquid rubber having a carbon black dispersion rate of 63% in which some uncrushed hard carbon black beads remained in the dispersion.

REFERENCE EXAMPLE 2

Into the mixer of Example 1 were charged 76.9 g of the liquid rubber R-45 HT and 233 g of hard HAF carbon black beads and the mixture was mixed at room temperature for 1 hour (the carbon black content was 300 parts per 100 parts of liquid rubber). The hard carbon black beads were not crushed and they remained flowable in granular form. Then, 38.5 g of the liquid rubber R-45 HT was added to the dispersion and the mixture was mixed for 1 hour (the carbon black content was decreased to 200 parts per 100 parts of liquid rubber). A substantial number of the hard carbon black beads were not crushed and remained in flowable granular form.

REFERENCE EXAMPLE 3

A mixture of 100 g of the liquid rubber R-45 HT, 1.0 g of an antioxidant (Antage BHT), 0.10 g of dibutyl-tin-dilaurate and 30 g of hard HAF carbon black beads were mixed 10 times in a three roller mill wherein the diameter of each roller was 4 inches and the slit width between the rollers was 0.1 mm. The carbon black was dispersed to give a pasty composition having a carbon black dispersion rate of 100%. It was possible to prepare a composition of carbon black and liquid rubber having a high dispersion rate by the conventional method using a three roller mill. However, the operation was very complicated compared to the simple operation of the invention.

REFERENCE EXAMPLE 4

The process of Reference 3 was followed except that 100 g of the liquid rubber CN-15 were used instead of 100 g of the liquid rubber R-45 HT. A similar pasty composition was obtained.

REFERENCE EXAMPLE 5

A mixture of 100 g of the liquid rubber R-45 HT, 1.0 g of antioxidant (Antage BHT), 0.10 g of dibutyl-tin-dilaurate and 30 g of hard GPF carbon black beads were passed six times through a three roller mill, wherein each roller had a diameter of 4 inches and the slit width between rollers was 0.1 mm, to disperse the carbon black into a soft pasty composition having a carbon black dispersion rate of 100%. The properties of the resulting cured products are shown in the following Table.

| PROPERTIES OF CURED PRODUCTS | | | | | | |
|---|---|---|---|---|---|---|
| | Composition of the carbon black | | Properties of the cured product | | | |
| Preparation | Liquid rubber | carbon black | Dispersion rate (%) | TES (kg/cm 2) | EL (%) | HD (JIS) |
| Example 1 | R-45HT | HAF | 100 | 97 | 320 | 62 |
| Example 2 | " | " | 100 | 98 | 345 | 62 |
| Example 3 | " | " | 100 | 100 | 360 | 62 |
| Example 4 | CN-15 | " | 100 | 120 | 320 | 64 |
| Example 5 | R-45HT | GPF | 100 | 59 | 315 | 55 |
| Reference 1 | R-45HT | HAF | 63 | 47 | 225 | 62 |
| Reference 2 | " | " | — *1 | — *2 | — *2 | — *2 |
| Reference 3 | " | " | 100 | 92 | 340 | 62 |
| Reference 4 | CN-15 | " | 100 | 121 | 330 | 64 |

PROPERTIES OF CURED PRODUCTS

| Preparation | Composition of the carbon black | | Properties of the cured product | | | |
| --- | --- | --- | --- | --- | --- | --- |
| | Liquid rubber | carbon black | Dispersion rate (%) | TES (kg/cm 2) | EL (%) | HD (JIS |
| Reference 5 | R-45HT | GPF | 100 | 56 | 265 | 58 |

*1 Nonuniform dispersion was visually observed.
*2 the properties of the cured products may be very inferior.

Each of the compositions of Examples 1, 2, 3, 4 and 5 and References examples 1, 2, 3, 4 and 5 were admixed with a tolylenediisocyanate composition, and each mixture was molded in a mold for the ASTM tensile strength test and was cured at 100° C for 90 minutes. When the liquid rubber R-45 HT was used, 7.7 parts of 80-tolylenediisocyanate (a mixture of 80% of 2,4-tolylenediisocyanate and 20% 2,6-tolylenediisocyanate) was added to 100 parts of liquid rubber (—NCO/—OH = 1.1). When the liquid rubber CN-15 was used, 6.4 parts of 80-tolylenediisocyanate was added (—NCO/—OH = 1.1). As it is clear from the results shown in the Table, the properties of cured products prepared using the multipurpose mixer according to the present invention were excellent compared to those of the cured products prepared in the complicated process of the three roller mill (Reference Examples 3–5). Also, the properties of the cured products prepared with the multipurpose mixer not present of the invention were very inferior compared to those of the present invention. (Reference Examples 1 and 2).

Having now fully described this invention, it will be apparent to one or ordinary skill in the art that many changes and modifications can be made thereto without departing from the spirit or scope of the invention as set forth herein.

What is claimed as new and desired to be secured by Letters Patent of the United States is:

1. In a process for blending liquid rubber and carbon black by stirring and dispersing a mixture of the carbon black in the liquid rubber, the improvement consisting essentially of initially dispersing carbon black in a liquid rubber using a mixer or a kneader for highly viscous material which is equipped with a stirrer by mixing 60 to 150 parts by weight of carbon black in 100 parts by weight of the liquid rubber and then diluting the resultant dispersion with said liquid rubber to prepare the final proportion of less than 50 parts of carbon black per 100 parts of liquid rubber using said mixer or kneader, where the dilution is carried out at a diluting ratio of less than 40 parts of carbon black per 100 parts of liquid rubber.

2. The process of claim 1, wherein said dilution is conducted in at least two steps by adding desired portions of the liquid rubber to said dispersion.

3. The process of claim 1, wherein said carbon black is crushed by stirring in the presence of additional liquid rubber which controls the stirring load.

4. The process of claim 1 wherein soft or hard carbon black beads are crushed by stirring to prepare the dispersion.

5. The process of claim 1, wherein said liquid rubber is a low molecular weight polymer having an average molecular weight of 500 – 30,000 and which is a conjugated diene polymer or copolymer.

6. The process of claim 1, wherein an antioxidant is added to the dispersion.

7. The process of claim 1 wherein a curing agent is added after diluting the dispersion.

* * * * *